(12) United States Patent
Yeh et al.

(10) Patent No.: US 8,555,299 B2
(45) Date of Patent: Oct. 8, 2013

(54) OPTICAL DISC DRIVE AND TRAY DRIVING DEVICE THEREOF

(75) Inventors: Shih-Lin Yeh, Taipei (TW); Chun-Lung Ho, Taipei (TW); Kun-Ta Ho, Taipei (TW); Ming-Hung Chung, Taipei (TW)

(73) Assignee: Philips & Lite-On Digital Solutions Corporation, Taipei (TW)

( * ) Notice: Subject to any disclaimer, the term of this patent is extended or adjusted under 35 U.S.C. 154(b) by 0 days.

(21) Appl. No.: 13/304,747

(22) Filed: Nov. 28, 2011

(65) Prior Publication Data

US 2012/0331490 A1 Dec. 27, 2012

(30) Foreign Application Priority Data

Jun. 23, 2011 (CN) .......................... 2011 1 0176802

(51) Int. Cl.
*G11B 17/03* (2006.01)
(52) U.S. Cl.
USPC ........................................................ 720/601

(58) Field of Classification Search
USPC ................. 474/100, 101, 112, 119, 120, 122, 474/139, 140, 144, 158–160, 171; 720/600–602, 606–608
See application file for complete search history.

(56) References Cited

U.S. PATENT DOCUMENTS

| | | | | |
|---|---|---|---|---|
| 3,805,706 | A | * | 4/1974 | Bancel .......................... 104/197 |
| 6,282,839 | B1 | * | 9/2001 | Fischer et al. ................ 474/120 |
| 2006/0254248 | A1 | * | 11/2006 | van Rooij et al. .................... 59/6 |
| 2009/0100451 | A1 | * | 4/2009 | Hayashi et al. ............... 720/607 |

* cited by examiner

*Primary Examiner* — Nathan Danielsen
(74) *Attorney, Agent, or Firm* — McClure, Qualey & Rodack, LLP

(57) ABSTRACT

A tray driving device of an optical disc drive in provided to comprising: a driving motor; a belt wheel, disposed on a driving shaft of the driving motor; a belt idler, connected to the belt wheel through a belt, wherein the belt idler has a belt groove for containing the belt, and a guiding inclined plane is protruded on the top of the belt idler; and a gear assembly, connected under the belt idler and connected to a tray.

6 Claims, 4 Drawing Sheets

OPTICAL DISC DRIVE AND TRAY DRIVING DEVICE THEREOF

This application claims the benefit of People's Republic of China application Serial No. 201110176802.4, filed Jun. 23, 2011, the subject matter of which is incorporated herein by reference.

BACKGROUND OF THE INVENTION

1. Field of the Invention

The invention relates in general to a tray driving device, and more particularly to a tray driving device used in an optical disc drive.

2. Description of the Related Art

In general, optical disc is loaded in/out by a tray in the half-height optical disc drive. The half-height optical disc drive usually contains a tray driving device for driving the tray out of the optical disc drive that user can put disc on the tray or take disc out from the tray. Then, the tray driving device drives the tray back into the optical disc drive. Therefore, the function of loading disc in/out is performed.

The tray driving device is driven by a driving motor, and the driving motor connects to a gear transmitting assembly. The tray is driven by the driving motor through the gear transmitting assembly. In this case, the gears of the gear transmitting assembly are tightly engaged to each other, and the engaged teeth of the gears are easily broken under a great shock.

In other design, the driving motor connects to the gear transmitting assembly through a belt for avoiding the engaged teeth of the gears from being broken caused by tightly engaged. However, the disadvantage is that the belt could fall off when optical disc is under a great shock resulting in the tray driving device being unworkable.

SUMMARY OF THE INVENTION

Accordingly, the invention provides a tray driving device of an optical disc drive, wherein the tray driving device is driven by a belt. In this invention, the belt idler is designed to improve the stability of belt transmission for preventing the belt from falling off caused by over vibration. Therefore, the reliability of the tray driving device is increased.

According to one aspect of the present invention, a tray driving devise used in an optical disc drive is provided to comprise a driving motor; a belt wheel, disposed on a driving shaft of the driving motor; a belt idler, connected to the belt wheel through a belt, wherein the belt idler has a belt groove for containing the belt, and a guiding inclined plane is protruded on the top of the belt idler; and a gear assembly, connected under the belt idler and connected to a tray.

According to another aspect of the present invention, an optical disc drive is provided to comprise a base; a tray, movably disposed on the base; a spindle motor, disposed on the base for supporting and rotating an optical disc; a pickup head, disposed on the base for reading information stored in the optical disc; and a tray driving device disposed on the base for driving the tray to load in/out of the optical disc drive, wherein the tray driving device comprises: a driving motor; a belt wheel, disposed on a driving shaft of the driving motor; a belt idler, connected to the belt wheel through a belt, wherein the belt idler has a belt groove for containing the belt, and a guiding inclined plane is protruded on the top of the belt idler; and a gear assembly, connected under the belt idler and connected to the tray.

BRIEF DESCRIPTION OF THE DRAWINGS

The invention will become apparent from the following detailed description of the preferred but non-limiting embodiments. The following description is made with reference to the accompanying drawings.

DETAILED DESCRIPTION OF THE INVENTION

Figure 1:
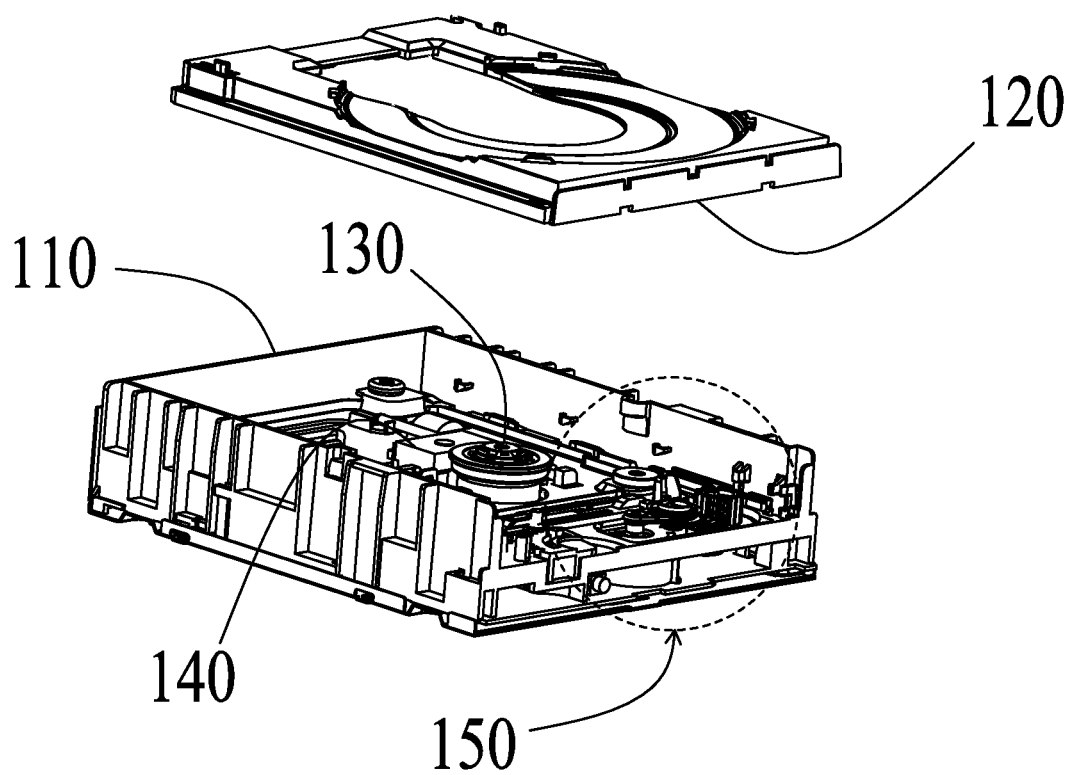
FIG. 1 shows an explosive view of an optical disc drive according to an embodiment of the present invention.

Please refer to FIG. 1. FIG. 1 shows an explosive view of an optical disc drive 100 according to an embodiment of the present invention. The optical disc drive 100 comprises a base 110, a tray 120 movably disposed on the base 110, a spindle motor 130 disposed on the base 110 for supporting and rotating an optical disc, a pickup head 140 disposed on the base 110 for reading the information stored in the optical disc, and a tray driving device 150 disposed on the base 110 for driving the tray 120 to load in/out of the optical disc drive 100.

Figure 2:
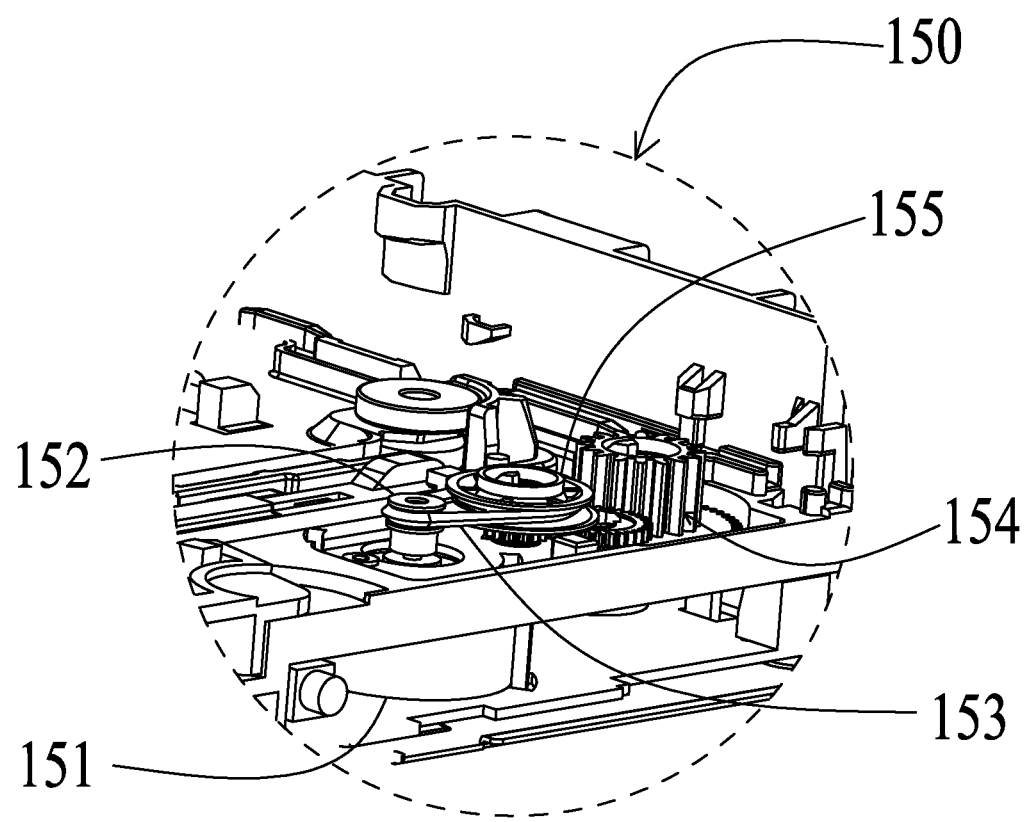
FIG. 2 shows an enlarged view of a tray driving device according to FIG. 1.

Please refer to FIG. 2. FIG. 2 shows an enlarged view of the tray driving device 150 according to FIG. 1. The tray driving device 150 comprises a driving motor 151, a belt wheel 152 disposed on a driving shaft of the driving motor 151, a belt idler 155 connected to the belt wheel 152 through a belt 153, and a gear assembly 154 connected to the belt wheel 152 and the tray 120 respectively.

When the driving motor 151 is powered, the belt wheel 152 disposed on the driving shaft of the driving motor 151 starts to rotate and, accordingly, drives the belt idler 155 through the belt 153. Then, the belt idler 155 drives the gear assembly 154 to bring the tray 120 to load in or out of the optical disc drive 100.

Figure 3:
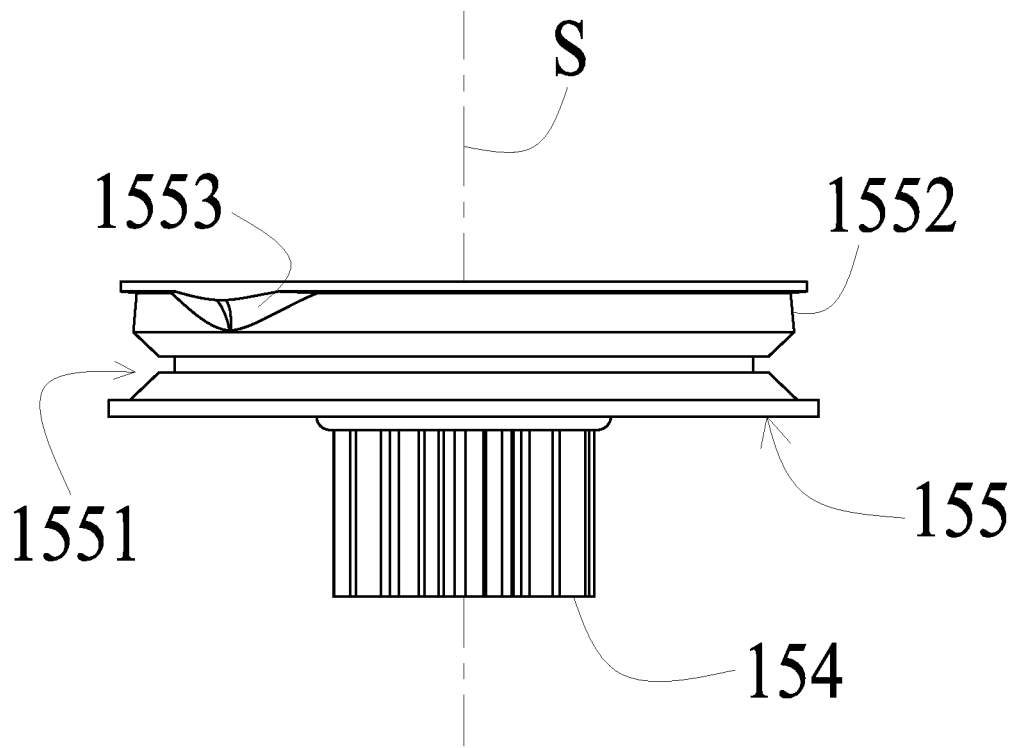
FIG. 3 shows an assembling of a belt idler and a gear assembly according to an embodiment of the present invention.

Next, please refer to FIG. 3. FIG. 3 shows an assembling of the belt idler 155 and the gear assembly 154 according to an embodiment of the present invention.

In order to prevent the belt 153 from falling off the belt idler 155 under an over shock or vibration, the belt idler 155 has a belt groove 1551 for containing the belt 153 as shown in FIG. 2. The other end of the belt 153 is connected to the belt wheel 152, and the gear assembly 154 is connected to the bottom of the belt idler 155. When the belt idler 155 is driven by the belt wheel 152 and the belt 153, the belt idler 155 is rotated about a rotating axis S and drives the gear assembly 154 to rotate together.

In this embodiment, a guiding inclined plane 1552 is protruded on the top of the belt idler 155, and the guiding inclined plane 1552 is disposed above the belt groove 1551. The guiding inclined plane 1552 is disposed around the rotating axis S, and the guiding inclined plane 1552 is retracted upwardly. In other words, the diameter at bottom of the guiding inclined plane 1552 is longer than the diameter at top of the guiding inclined plane. Furthermore, a guiding spot 1553 is outwardly protruded on the guiding inclined plane 1552. The outer surface at the radial direction of the guiding spot 1553 is a curved surface, and the curved surface is inwardly retraced. In the present invention, the number of the guiding spot is not limited. The number of the guiding spot can be design based on actual implement.

Figure 4:
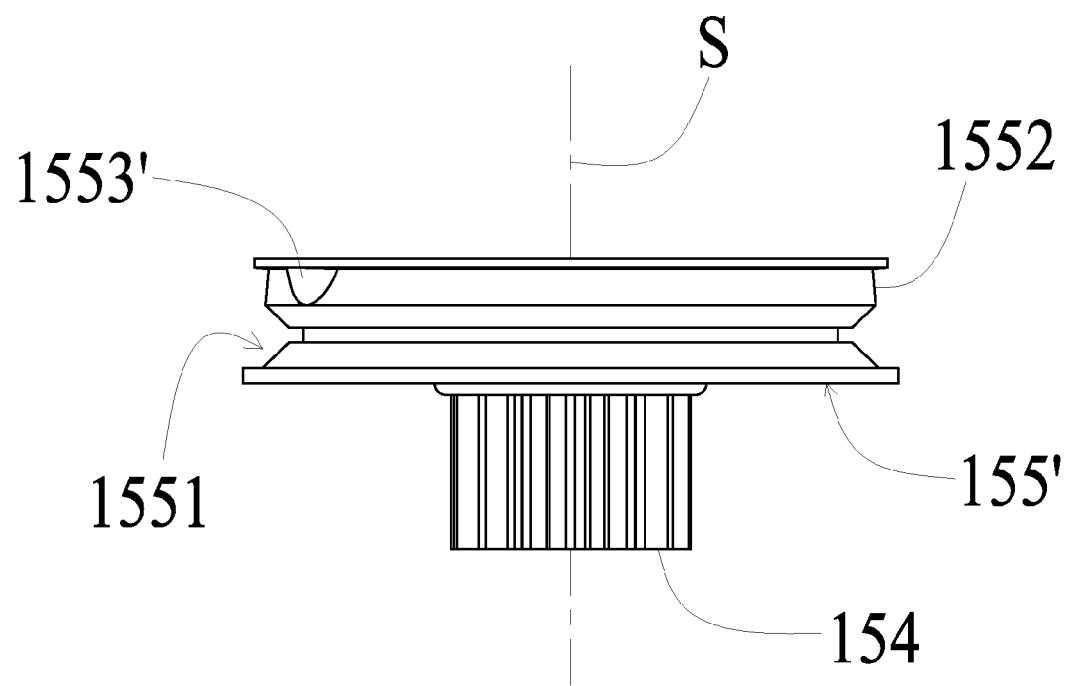
FIG. 4 shows an assembling of a belt idler and a gear assembly according to another embodiment of the present invention.

Please refer to FIG. 4. FIG. 4 shows an assembling of a belt idler 155' and a gear assembly 154 according to another embodiment of the present invention.

In this another embodiment, the belt idler 155' has a belt groove 1551 for containing the belt 153 as shown in FIG. 2. The other end of the belt 153 is connected to the belt wheel 152, and the gear assembly 154 is connected to the bottom of the belt idler 155'. When the belt idler 155' is driven by the belt wheel 152 and the belt 153, the belt idler 155' is rotated about a rotating axis S and drives the gear assembly 154 to rotate together.

In this another embodiment, a guiding inclined plane 1552 is protruded on the top of the belt idler 155', and the guiding inclined plane 1552 is disposed above the belt groove 1551. The guiding inclined plane 1552 is disposed around the rotating axis S, and the guiding inclined plane 1552 is retracted upwardly. In other words, the diameter at bottom of the guiding inclined plane 1552 is longer than the diameter at top of the guiding inclined plane. Furthermore, a guiding spot 1553' is outwardly protruded on the guiding inclined plane 1552. The outer surface at the radial direction of the guiding spot 1553 is a curved surface, and the curved surface is outwardly protruded. In the present invention, the number of the guiding spot is not limited. The number of the guiding spot can be design based on actual implement.

According to the embodiments of the belt idler, when the optical disc drive is under an over vibration and the belt is attempting to fall off the belt groove, the guiding inclined plane and the guiding spot can efficiently guide the belt back into the belt groove. Therefore, the belt is prevented from falling off the belt idler.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A tray driving device of an optical disc drive, wherein the optical disc drive has a tray, comprising:
    a driving motor;
    a belt wheel, disposed on a driving shaft of the driving motor;
    a belt idler, connected to the belt wheel through a belt, wherein the belt idler has a belt groove for containing the belt, and a guiding inclined plane is protruded on the top of the belt idler; and
    a gear assembly, connected under the belt idler and connected to the tray,
    wherein the guiding inclined plane is disposed above the belt groove and around a rotating axis, and the guiding inclined plane is retracted upwardly,
    wherein a guiding spot is outwardly protruded on the guiding inclined plane.

2. The tray driving device according to claim 1, wherein an outer surface at a radial direction of the guiding spot is a curved surface, and the curved surface is inwardly retracted.

3. The tray driving device according to claim 1, wherein an outer surface at a radial direction of the guiding spot is a curved surface, and the curved surface is outwardly protruded.

4. An optical disc drive, comprising:
    a base;
    a tray, movably disposed on the base;
    a spindle motor, disposed on the base for supporting and rotating an optical disc;
    a pickup head, disposed on the base for reading information stored in the optical disc; and
    a tray driving device disposed on the base for driving the tray to load in/out of the optical disc drive, wherein the tray driving device comprises:
        a driving motor;
        a belt wheel, disposed on a driving shaft of the driving motor;
        a belt idler, connected to the belt wheel through a belt, wherein the belt idler has a belt groove for containing the belt, and a guiding inclined plane is protruded on the top of the belt idler; and
        a gear assembly, connected under the belt idler and connected to the tray,
    wherein the guiding inclined plane is disposed above the belt groove and around a rotating axis, and the guiding inclined plane is retracted upwardly,
    wherein a guiding spot is outwardly protruded on the guiding inclined plane.

5. The tray driving device according to claim 4, wherein an outer surface at a radial direction of the guiding spot is a curved surface, and the curved surface is inwardly retracted.

6. The tray driving device according to claim 4, wherein an outer surface at a radial direction of the guiding spot is a curved surface, and the curved surface is outwardly protruded.

* * * * *